United States Patent
Gupta (10) Patent No.: US 8,917,764 B2
(45) Date of Patent: Dec. 23, 2014

(54) SYSTEM AND METHOD FOR VIRTUALIZATION OF AMBIENT ENVIRONMENTS IN LIVE VIDEO STREAMING

(75) Inventor: Puneet Gupta, Bangalore (IN)

(73) Assignee: Ittiam Systems (P) Ltd, Bangalore (IN)

( * ) Notice: Subject to any disclaimer, the term of this patent is extended or adjusted under 35 U.S.C. 154(b) by 354 days.

(21) Appl. No.: 13/204,738

(22) Filed: Aug. 8, 2011

(65) Prior Publication Data

US 2013/0039409 A1 Feb. 14, 2013

(51) Int. Cl.
- *H04N 7/12* (2006.01)
- *H04N 11/02* (2006.01)
- *G06T 7/20* (2006.01)
- *G06K 9/00* (2006.01)
- *G06K 9/32* (2006.01)
- *H04N 7/14* (2006.01)

(52) U.S. Cl.
CPC .......... *G06T 7/2006* (2013.01); *G06K 9/00771* (2013.01); *G06K 9/3233* (2013.01); *H04N 7/147* (2013.01); *G06T 2207/20032* (2013.01); *G06T 2207/20144* (2013.01); *G06T 2207/30196* (2013.01)
USPC ................................ 375/240.02; 375/240.24

(58) Field of Classification Search
CPC ............................ H04N 7/50; H04N 7/26244
USPC ......................................... 375/240.2, 240.24
See application file for complete search history.

(56) References Cited

U.S. PATENT DOCUMENTS

| | | |
|---|---|---|
| 5,764,306 A | 6/1998 | Steffano |
| 6,590,601 B2 | 7/2003 | Sukeno et al. |
| 6,798,897 B1 | 9/2004 | Rosenberg |
| 7,720,283 B2 | 5/2010 | Sun et al. |
| 7,916,944 B2 | 3/2011 | Yang et al. |
| 2005/0169537 A1 | 8/2005 | Keramane |
| 2007/0133880 A1* | 6/2007 | Sun et al. ...................... 382/195 |
| 2007/0160288 A1* | 7/2007 | Hoffman et al. .............. 382/168 |
| 2008/0181453 A1* | 7/2008 | Xu et al. ....................... 382/103 |
| 2009/0110078 A1* | 4/2009 | Crinon .................... 375/240.24 |
| 2010/0098331 A1 | 4/2010 | Meng et al. |
| 2012/0063646 A1* | 3/2012 | Lu ................................. 382/107 |
| 2012/0294367 A1* | 11/2012 | Ziauddin et al. ......... 375/240.16 |

FOREIGN PATENT DOCUMENTS

WO PCT/US2007/020489 A2 4/2008

* cited by examiner

*Primary Examiner* — Dave Czekaj
*Assistant Examiner* — Tsion B Owens
(74) *Attorney, Agent, or Firm* — Prakash Nama; Global IP Services, PLLC (57) ABSTRACT

A system and method for virtualization of ambient environments in live video streaming are disclosed. In one embodiment, motion detection is performed to obtain motion information in a current frame in a live video stream. Further, a background model is computed using the motion information. Furthermore, background subtraction is performed using the background model to obtain foreground and background pixels for the current frame in the live video stream. In addition, the obtained foreground and background pixels are refined. Based on the obtained refined foreground and background pixels, a virtualized environment is generated for the current frame by substituting the background pixels. Moreover, the steps of pre-processing, performing, computing, refining, generating and encoding are repeated for a next frame in the live video stream.

29 Claims, 6 Drawing Sheets

SYSTEM AND METHOD FOR VIRTUALIZATION OF AMBIENT ENVIRONMENTS IN LIVE VIDEO STREAMING

FIELD OF TECHNOLOGY

The present invention relates in general to video streaming and more particularly, to virtualization of ambient environments in live video streaming.

BACKGROUND

In a real-world video streaming scenario (e.g., teleconference and telepresence) most users have a static video camera which captures a video scene and streams it to remote participants or receivers over a network. The video scene captured by the video camera includes specific regions or objects of interest (called foreground objects) and background objects. In typical scenarios, people or human subjects in the scene constitute the foreground objects. The background objects include objects, such as walls, book shelves, desk or table surface, curtains, furniture and so on. For reasons of privacy, security, network bandwidth conservation or performance optimality, the user may desire to remove the background objects in the video without altering the existing arrangement in the scene.

In such scenarios, generally, the background objects can be replaced, with any other image/video image, using techniques, such as blue screen imaging and chroma keying. However, these techniques use a physical monochromatic background screen mounted behind the foreground objects (often the user) whose background objects are to be removed and are therefore restrictive for usage in normal user ambient environments. One well known example of the use of the blue screen imaging is a TV weatherperson superimposed over a video view of a weather map. Thus, in a generic, live video streaming scenario, the user may not be able to use these techniques as the physical monochromatic background screen is an impractical and cumbersome pre-requisite.

BRIEF DESCRIPTION OF THE DRAWINGS

Embodiments of the present invention are illustrated by way of an example and not limited to the figures of the accompanying drawings, in which like references indicate similar elements and in which.

The drawings described herein are for illustration purposes only and are not intended to limit the scope of the present disclosure in any way.

DETAILED DESCRIPTION

A system and method for virtualization of ambient environments in live video streaming are disclosed. In the following detailed description of the embodiments of the invention, references are made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1:
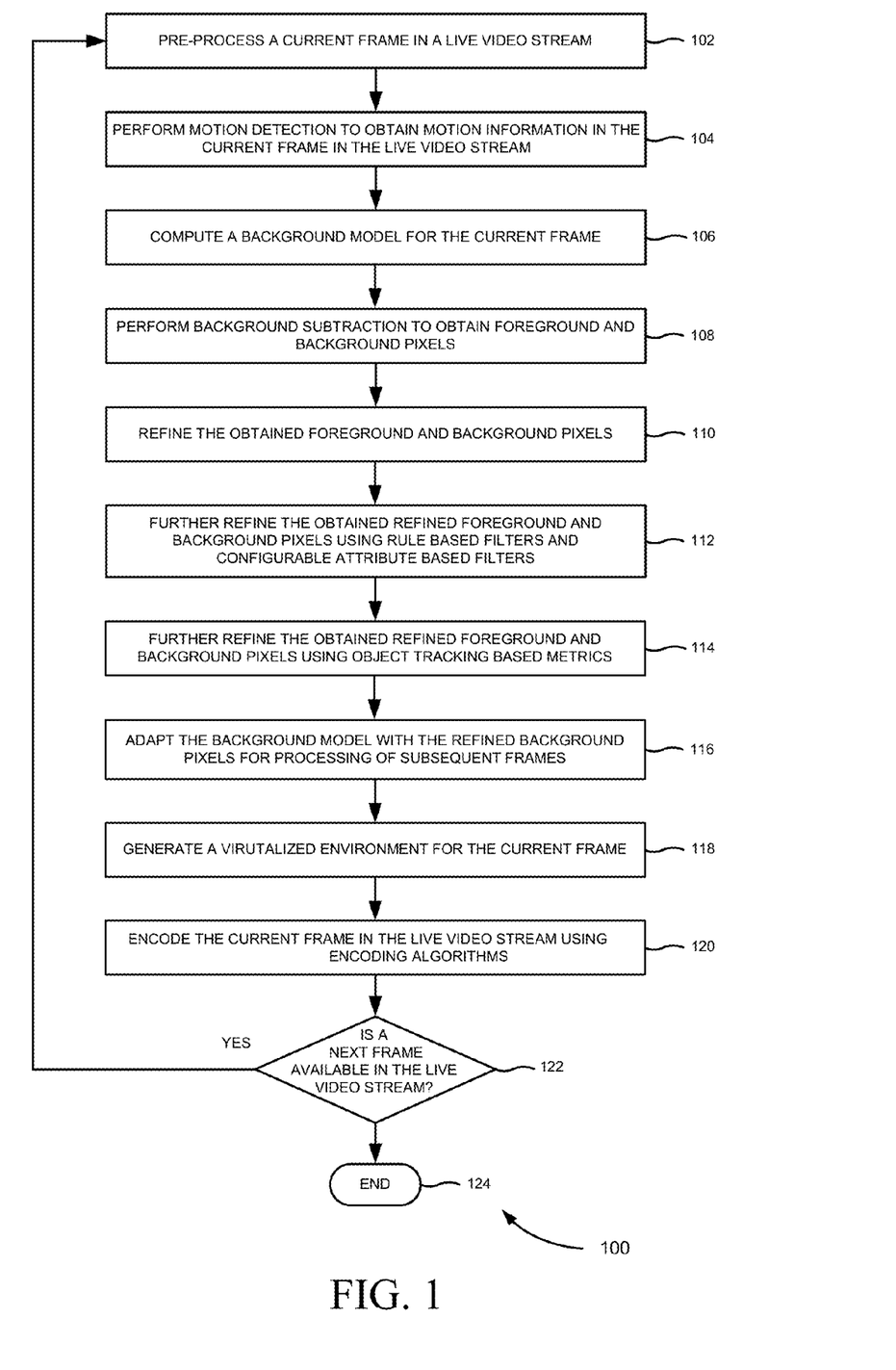
FIG. 1 is a flowchart illustrating a method for virtualization of ambient environments in live video streaming, according to one embodiment.

FIG. 1 is a flowchart 100 illustrating a method for the virtualization of ambient environments in the live video streaming, according to one embodiment. In this embodiment, the live video streaming includes a live video stream coming from a single and fixed-mounted video camera. At block 102, a current frame in the live video stream is pre-processed using performance optimization or performance enhancement algorithms, such as a spatial scaling algorithm, a noise reduction algorithm and a sub-sampled frame rate operation algorithm.

At block 104, motion detection is performed to obtain motion information in the current frame in the live video stream. At block 106, a background model is computed using the motion information. At block 108, background subtraction is performed using the computed background model to obtain foreground and background pixels for the current frame in the live video stream.

At block 110, the obtained foreground and background pixels are refined. In one embodiment, the obtained foreground and background pixels are refined using a median filter and clustering algorithms. Exemplary clustering algorithms include dilation and erosion post processing algorithms. At block 112, the obtained refined foreground and background pixels are further refined using rule based filters and configurable attributes based filters. Exemplary configurable attribute based filters include a size based filter, an aspect ratio based filter, a symmetry based filter, a cluster density based filter, a histogram based filter and the like. At block 114, the obtained refined foreground and background pixels are further refined using object tracking based metrics.

At block 116, the obtained background model is adapted with the refined background pixels for processing of subsequent frames. Further, the adaptation of the background model is controlled based on events and rules defined for a specific application. Once the refined background and foreground regions are obtained, at block 118, a virtualized environment is generated for the current frame by substituting the background pixels based on the obtained refined foreground and background pixels.

At block 120, the current frame in the live video stream is encoded using context aware encoding algorithms, such as a selective encoding of regions of interest (ROI) algorithm and a scalable video encoding (SVC) algorithm. At block 122, a check is made to determine whether a next frame is available in the live video stream. If a next frame is available in the live video stream, then the process steps are repeated from the block 102. If a next frame is not available in the live video stream, then the process ends at block 124.

Figure 2:
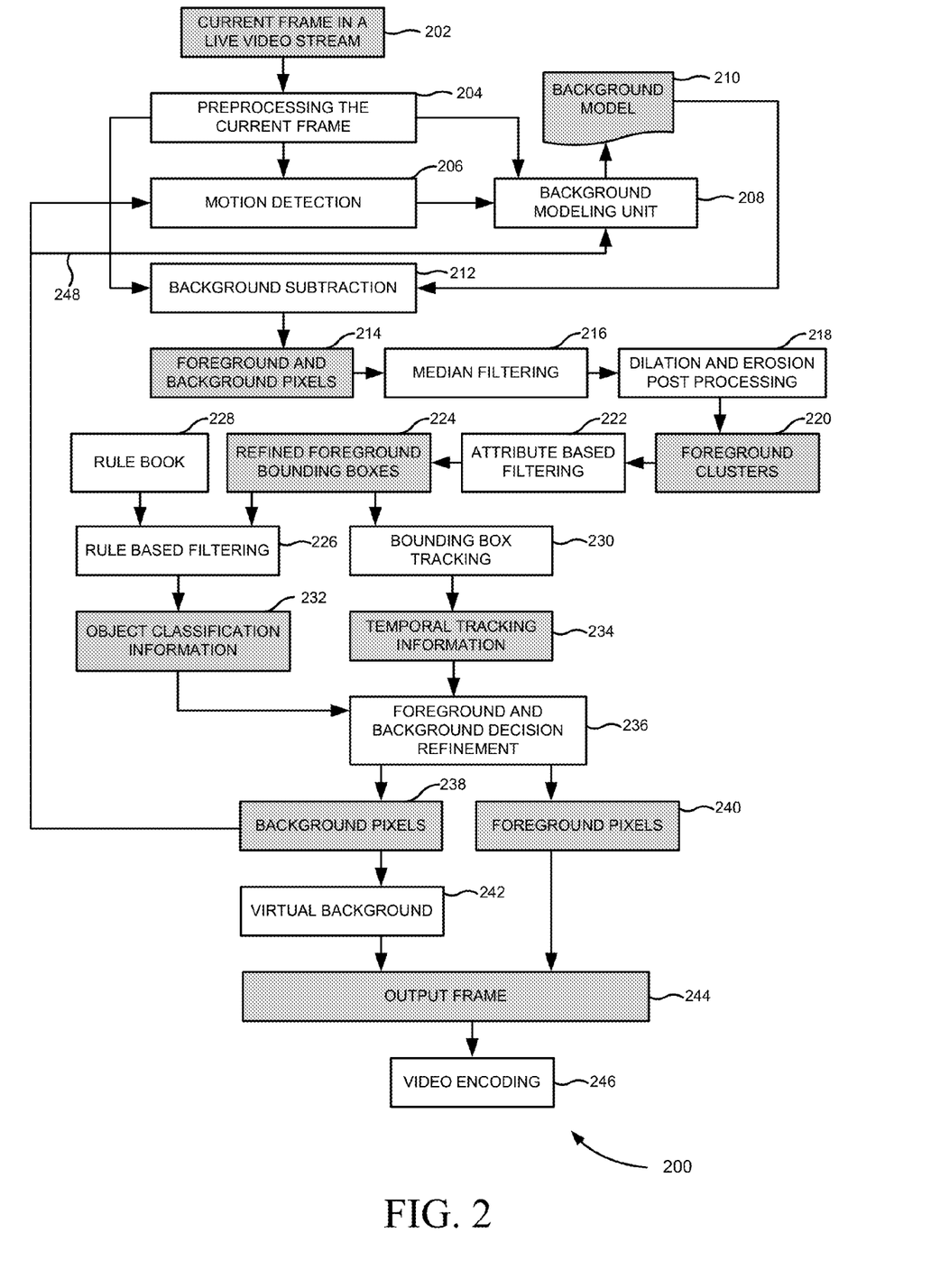
FIG. 2 is another flowchart illustrating a method for the virtualization of ambient environments in the live video streaming, according to one embodiment.

Referring now to FIG. 2, another flowchart 200 illustrates a method for virtualization of ambient environments in live video streaming, according to one embodiment. As shown in FIG. 2, block 202 includes a current frame in a live video stream. In one embodiment, the live video stream is obtained from a fixed-mounted video camera. At block 204, the current frame is pre-processed using performance optimization or performance enhancement algorithms, such as a temporal/spatial scaling algorithm, a noise reduction algorithm, a sub-sampled frame rate operation algorithm and the like. The performance optimization or performance enhancement algorithms enable scaling down the size, resolution and/or number of frames in the live video stream to be processed and encoded to reduce the cost of performing the virtualization of ambient environments in the live video stream and also to reduce computational intensity. For example, the sub-sampling frame rate in the sub-sampled frame rate operation algorithm is determined based on the computational capacity of a system on which the processing is performed. The performance enhancement algorithms, such as the noise reduction algorithm facilitate the process of motion detection in the current frame to be resistant to the noise introduced by the fixed-mounted video camera which captures the live video.

At block 206, the motion detection is performed to obtain motion information in the current frame in the live video stream. The motion information includes information regarding moving and non-moving objects in the current frame. Exemplary moving objects include people or human subjects in the current frame which generally constitute the foreground objects. Exemplary non-moving objects include walls, book shelves, desk or table surfaces, curtains, furniture and so on which generally constitute the background objects.

In an exemplary embodiment, a user can specify a set of regions in the current frame (in terms of coordinates and sizes) that are of interest to the user. The set of regions specified by the user are referred to as active regions in the live video stream. In this exemplary embodiment, motion detection is performed only in the active regions in the current frame. In absence of the information regarding the active regions, the whole frame is considered as an active region and is eligible for performing motion detection. The use of the active regions enables motion detection to be performed in an optimal manner only in the regions of interest to the user.

At block 208, a background model is computed using the motion information obtained from the block 206. The background model contains information regarding which pixels in the current frame are background pixels and which are foreground pixels, and the information regarding color values in the pixels. Initially, all the pixels in the current frame are considered as background pixels. However, a provision is made to allow the user to demarcate some regions in the active regions (in terms of bounding boxes) as foreground pixels. Further, the computation of the background model also uses the output of the pre-processing of the current frame performed at the block 204. As shown in FIG. 2, block 210 includes the obtained background model. The obtained background model is stored for processing of subsequent frames of the live video stream.

At block 212, background subtraction is performed using the background model obtained from the block 210 and the output of the pre-processing of the current frame performed at the block 204. In this embodiment, the background model obtained from the block 210 is subtracted from the pre-processed current frame obtained from the block 204 to obtain foreground and background pixels for the current frame in the live video stream. As shown in FIG. 2, block 214 includes the obtained foreground and background pixels.

At block 216, the obtained foreground and background pixels are refined using a median filter. In order to refine the foreground pixels, the median filter detects and filters out scattered, isolated pixels in the obtained foreground pixels. Further in order to refine the background pixels, the pixels which are filtered out from the foreground pixels are added to the obtained background pixels. At block 218, the obtained foreground and background pixels are further refined using clustering algorithms, such as dilation and erosion post processing algorithms. In this embodiment, in the dilation post processing algorithm, background pixels touching a foreground pixel often get relabeled as foreground pixels. In the erosion post processing algorithm, foreground pixels adjoining background pixels are relabeled as background pixels. Also in some embodiments, the dilation post processing algorithm makes objects larger and can merge multiple small regions of foreground pixels into a unified cluster, while the erosion post processing algorithm helps trim the edges of these clusters. In these embodiments, the dilation post processing is performed before the erosion post processing to ensure that the smaller clusters have a chance to get grouped into bigger clusters, before the erosion post processing has a chance to gnaw off the edges. As a result of performing the dilation and erosion post processing, further refined foreground and background pixels are obtained. The further refined foreground pixels are referred to as foreground clusters. As shown in FIG. 2, block 220 includes the foreground clusters.

At block 222, the obtained foreground clusters are further refined using configurable attribute based filters. Exemplary configurable attribute based filters include a size based filter, an aspect ratio based filter, a symmetry based filter, a cluster density based filter and a histogram based filter. In this embodiment, the attributes of the attribute based filters are user configurable. Based on an application and the attributes, certain portions of the foreground clusters may be filtered out. For example, a portion of the foreground clusters which does not comply with an aspect ratio constraint configured by the user, in the aspect ratio based filter, is filtered out from the foreground clusters and included as part of the background pixels. Further, the portion of the foreground clusters filtered out by the configurable attribute based filters is added to the refined background pixels to further refine the background pixels. As a result of the attribute based filtering, refined foreground clusters are obtained. A bounding box is then calculated around each of these foreground clusters for the purpose of object tracking over time and rule based filtering. As shown in FIG. 2, block 224 includes the refined foreground bounding boxes. The refined foreground bounding boxes include rectangular regions in the current frame which are identified as the foreground objects.

At block 226, the obtained refined foreground bounding boxes are further refined using rule based filters. The rules associated with the rule based filters are user configurable and are stored in a rule book as shown in block 228. Based on the rules configured by the user, the objects in the refined foreground bounding boxes are classified. For example, the objects are classified as humans and non-humans. As shown in FIG. 2, block 232 includes the object classification information. Based on the obtained object classification information, the "relevant" foreground objects are identified for the application scenario. The remaining refined foreground bounding boxes are relabeled as a part of the background objects.

At block 230, the obtained refined foreground bounding boxes are further refined using object tracking based metrics. The object tracking based metrics include the bounding box tracking. In this embodiment, any movement of the foreground objects in the refined foreground bounding boxes is tracked in the block 230. As shown in FIG. 2, block 234 includes the temporal tracking information obtained from the block 230. The object tracking involves keeping track (in terms of locations and dimensions) of the objects labeled as foreground objects as they move across the active regions and is used to rectify any errors in motion detection based labeling of the background objects. In an example scenario, objects that have stopped moving might not be labeled as foreground objects by the motion detection algorithm, but need to continue being a part of the foreground objects. In such a scenario, the object tracking based metrics ensures that such objects are updated as foreground objects before virtual environment is added or the background model is updated.

At block 236, the decision of the identified foreground and background objects is refined using the object classification information obtained from block 232 and the temporal tracking information obtained from the block 234. Based on the refined decision, the foreground pixels and the background pixels are obtained as shown in blocks 240 and 238, respectively. The background pixels include portions of the current frame other than the foreground pixels. Further, using the obtained background pixels in the block 238, the background model is adapted for processing of subsequent frames. This is indicated by arrow 248. Furthermore, the adaptation is controlled based on events and rules defined for a specific application.

At block 242, a virtual background is obtained from the user. Exemplary virtual background includes sceneries, graphics, animations, news, advertisements, personalized marketing pitches using virtual tours, coverage and reporting of events, personal videos and pictures, news bulletins, weather forecast, stock tickers and the like. At block 244, an output frame including the foreground objects superimposed on the virtual background is obtained. Exemplary applications for the virtualization of ambient environments include sharing personal pictures and videos during video chat or telephony, advertising during video chat or telephony, animation or graphics overlay in gaming environments, special effects for cameras or imaging devices and the like.

At block 246, the obtained output frame is encoded using context aware encoding techniques, such as H.264, MPEG2, MPEG4, VC1 and the like which work on the basic premise that the foreground pixels are the ROI for encoding and could be selectively encoded at a higher encoding quality, while the background pixels can be encoded at lower quality. The information about the ROI can be embedded in the bit stream itself for the client to decipher the specifics of encoding. This approach can lead to significant savings in the bandwidth consumption (when this encoded data is transmitted over network) and storage memory utilization (if the streamed content is also recorded to disk). Similarly, algorithms like SVC, the Annex-G extension for H.264/MPEG-4 AVC video compression standard, could be used to tune and optimize the system performance by using temporal, spatial or quality scalability for encoding the foreground and background objects in any frame.

Figure 3:
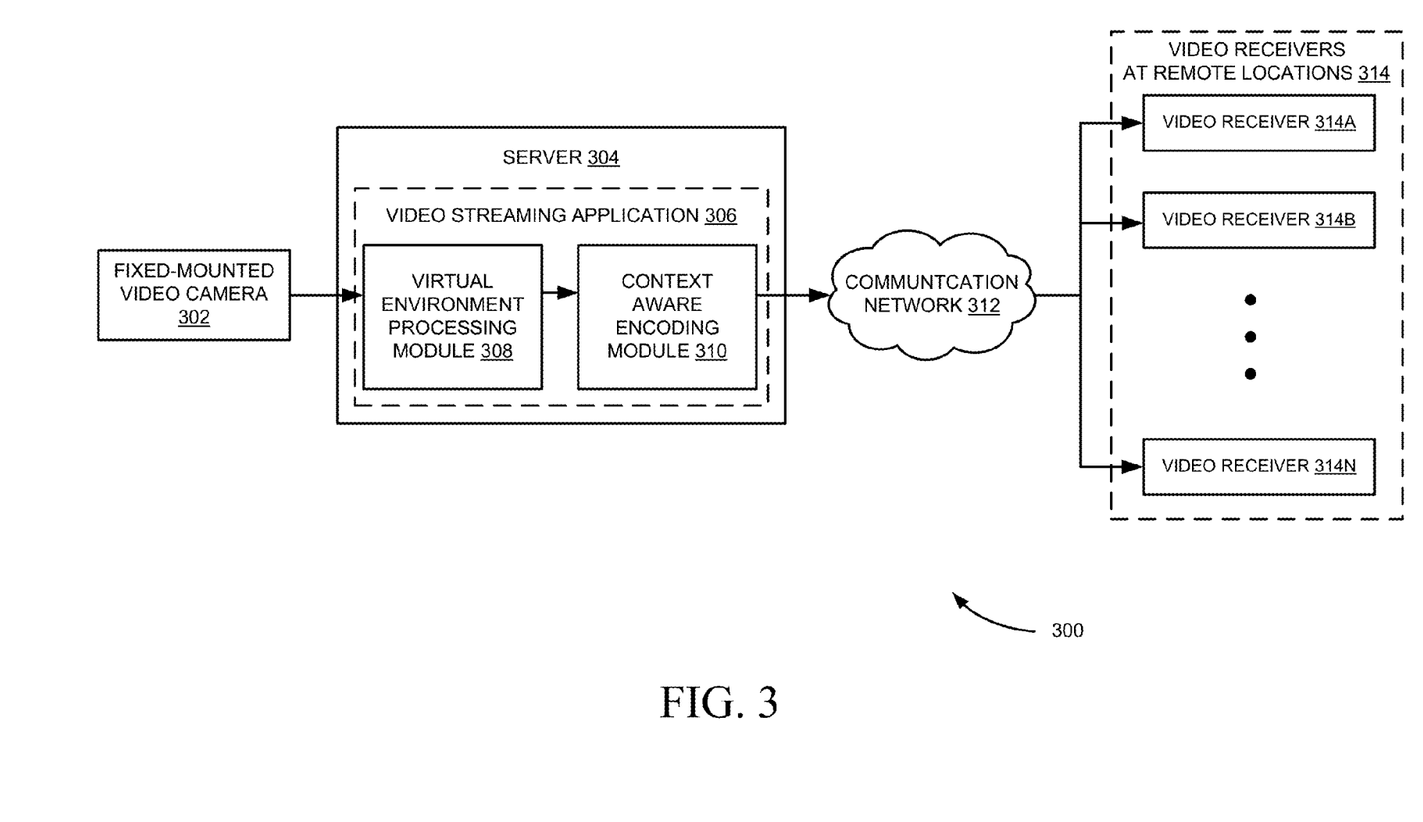
FIG. 3 is a block diagram illustrating a system for the virtualization of ambient environments in the live video streaming using the process shown in FIGS. 1 and 2, according to one embodiment.

Referring now to FIG. 3, a block diagram 300 illustrating a system for virtualization of ambient environments in live video streaming using the process shown in FIGS. 1 and 2, according to one embodiment. Particularly, FIG. 3 illustrates a fixed-mounted video camera 302, a server 304 and video receivers at remote locations 314. As shown in FIG. 3, the fixed-mounted video camera 302 is coupled to the server 304 via a wired link (analog or digital). Further as shown in FIG. 3, the server 304 includes a video streaming application 306. Furthermore as shown in FIG. 3, the video receivers at remote locations 314 include a plurality of video receivers 314A-N. Exemplary video receivers 314A-N include a personal computer, a laptop, a tablet, a television and the like. In addition, each of the video receivers 314A-N in the video receivers at remote locations 314 is coupled to the server 304 via a communication network 312. Exemplary communication network 312 includes an Ethernet network, local area network (LAN), Internet protocol (IP) network and the like.

In one embodiment, the video streaming application 306 residing in the server 304 includes a virtual environment processing module 308 and a context aware encoding module 310. In operation, the fixed-mounted video camera 302 captures a live video stream and sends each frame in the live video stream to the virtual environment processing module 308 in the server 304. Initially, the virtual environment processing module 308 pre-processes a current frame in the live video stream using performance optimizing or performance enhancement algorithms, such as a spatial scaling algorithm, a noise reduction algorithm and a sub-sampled frame rate operation algorithm. This is explained in more detail with reference to FIG. 2.

Further in operation, the virtual environment processing module 308 performs motion detection in the current frame in the live video stream to obtain motion information. This is explained in more detail with reference to FIG. 2. Furthermore in operation, the virtual environment processing module 308 computes a background model using the motion information. This is explained in more detail with reference to FIG. 2.

In addition in operation, the virtual environment processing module 308 performs background subtraction using the background model to obtain foreground and background pixels for the current frame in the live video stream. The obtained foreground and background pixels are refined using the median filter and clustering algorithms. The clustering algorithms include dilation and erosion post processing algorithms shown in FIG. 2. Further, the obtained refined foreground and background pixels are refined by the virtual environment processing module 308 using rule based filters and configurable attribute based filters. Exemplary configurable attribute based filters include a size based filter, an aspect ratio based filter, a symmetry based filter, a cluster density based filter and a histogram based filter. Furthermore, the obtained refined foreground and background pixels are further refined using object tracking based metrics. The filters used to refine the foreground and background pixels are explained in more detail with reference to FIG. 2.

Moreover in operation, the virtual environment processing module 308 adapts the background model with the refined background pixels for processing of subsequent frames in the live video stream. Also, the adaptation of the background model is controlled based on events and rules defined for a specific application. Based on the obtained refined foreground and background pixels, the virtual environment processing module 308 generates an output frame including a virtualized environment for the current frame by substituting the background pixels with a virtual background. This is explained in more detail with reference to FIG. 2. In addition in operation, the steps of pre-processing, performing, computing, refining, generating and encoding the current frame in the live video stream are repeated for the next frame in the live video stream.

Further in operation, the output frame is sent to the context aware encoding module 310. The context aware encoding module 310 encodes each frame in the live video stream using context aware encoding algorithms, such as a selective encoding of ROI algorithm, a SVC algorithm and the like. The encoded video frames are then streamed to the video receivers at remote locations 314 via the communication network 312.

Figure 4:
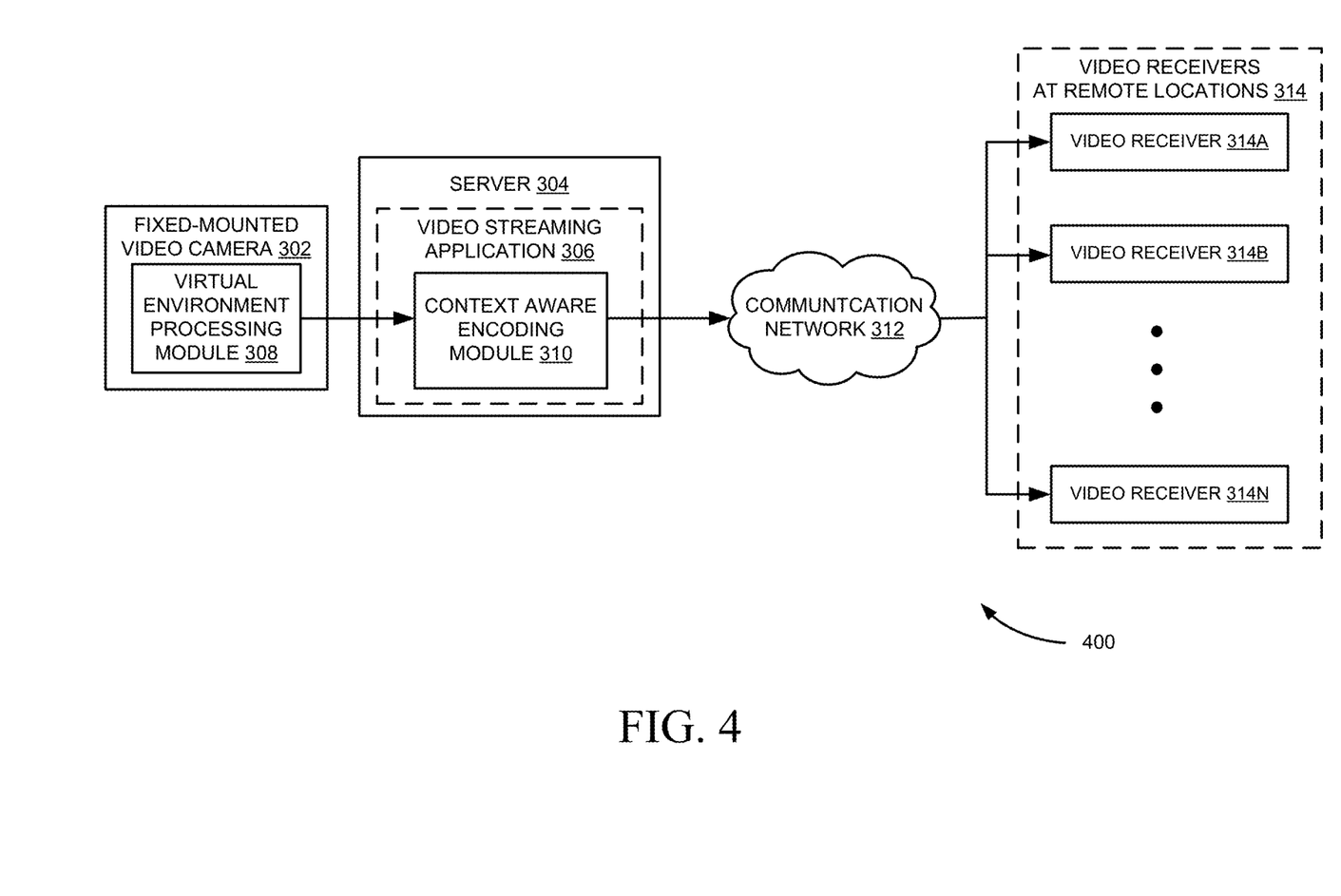
FIG. 4 is another block diagram illustrating a system for the virtualization of ambient environments in the live video streaming using the process shown in FIGS. 1 and 2, according to one embodiment.

Referring now to FIG. 4, another block diagram 400 illustrates a system for the virtualization of ambient environments in the live video streaming using the process shown in FIGS. 1 and 2, according to one embodiment. Particularly, FIG. 4 illustrates another configuration of the system shown in FIG. 3 for the virtualization of ambient environments in the live video streaming. In this embodiment, the fixed-mounted video camera 302 includes the virtual environment processing module 308 and the video streaming application 306 includes the context aware encoding module 310, as shown in FIG. 4. The functionalities of the virtual environment processing module 308 and the context aware encoding module 310 are explained in detail with reference to FIG. 3.

In this embodiment, the frame output from the virtual environment processing module 308 in the fixed-mounted video camera 302 is sent to the context aware encoding module 310 in the video streaming application 306. Further, each of the output frames is encoded by the context aware encoding module 310. Furthermore, the encoded frames are streamed to the video receivers at remote locations 314 via the communication network 312 by the video streaming application 306.

Figure 5:
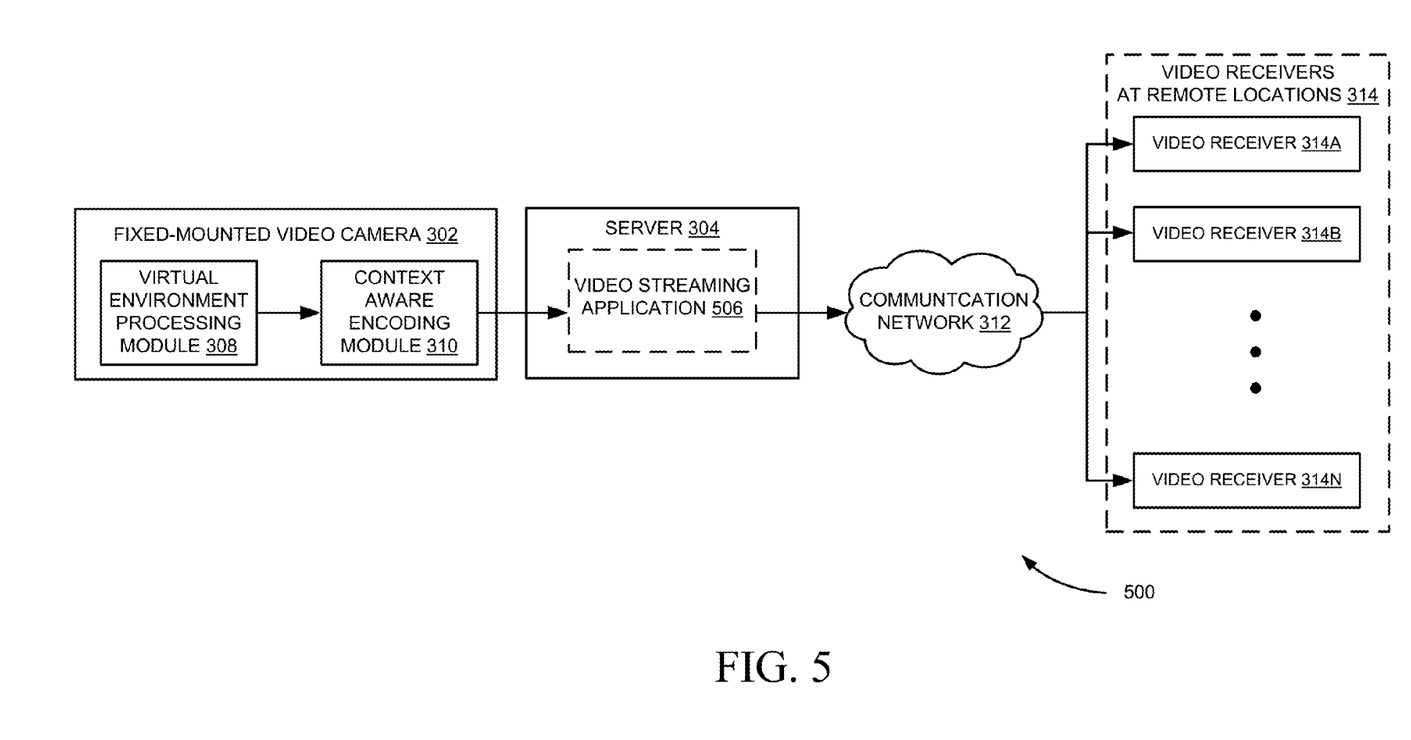
FIG. 5 is yet another block diagram illustrating a system for the virtualization of ambient environments in the live video streaming using the process shown in FIGS. 1 and 2, according to one embodiment.

Referring now to FIG. 5, yet another block diagram 500 illustrates a system for the virtualization of ambient environments in the live video streaming using the process shown in FIGS. 1 and 2, according to one embodiment. Particularly, FIG. 5 illustrates yet another configuration of the system shown in FIG. 3 for the virtualization of ambient environments in the live video streaming. In this embodiment, the fixed-mounted video camera 302 includes the virtual environment processing module 308 and the context aware encoding module 310, as shown in FIG. 5. The functionalities of the virtual environment processing module 308 and the context aware encoding module 310 are explained in detail with reference to FIG. 3.

In this embodiment, the frame output from the virtual environment processing module 308 in the fixed-mounted video camera 302 is sent to the context aware encoding module 310. Further, each of the output frames is encoded by the context aware encoding module 310 and sent to the video streaming application 306 in the server 304. Furthermore, the video streaming application 306 streams the encoded frames to the video receivers at remote locations 314 via the communication network 312.

Figure 6:
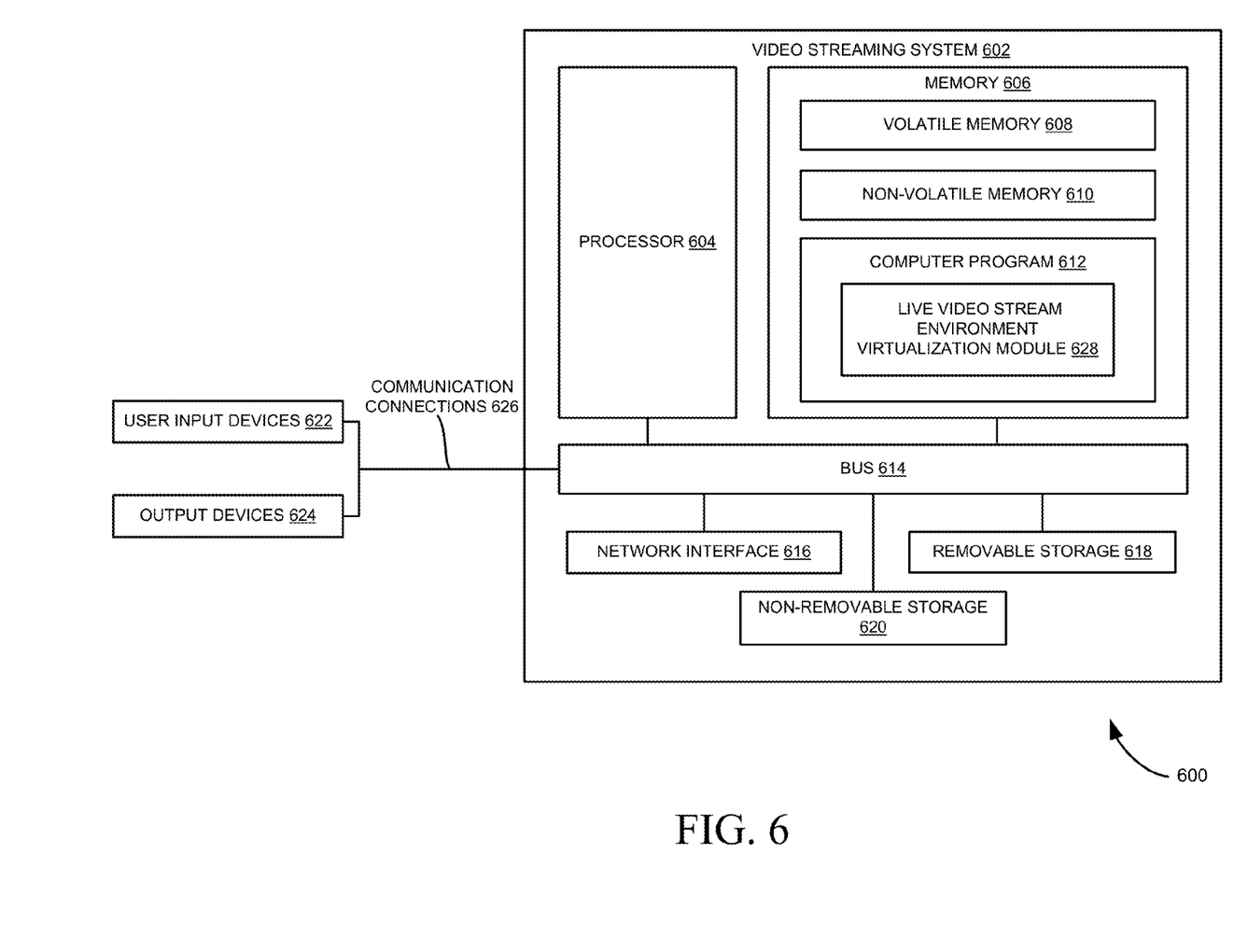
FIG. 6 illustrates a video streaming system including a live video stream environment virtualization module for the virtualization of ambient environments in the live video streaming using the process shown in FIGS. 1 and 2, according to one embodiment.

Referring now to FIG. 6, which illustrates a video streaming system 602 including a live video stream environment virtualization module 628 for the virtualization of ambient environments in the live video streaming using the process shown in FIGS. 1 and 2, according to one embodiment. FIG. 6 and the following discussions are intended to provide a brief, general description of a suitable computing environment in which certain embodiments of the inventive concepts contained herein are implemented.

The video streaming system 602 includes a processor 604, memory 606, a removable storage 618, and a non-removable storage 620. The video streaming system 602 additionally includes a bus 614 and a network interface 616. As shown in FIG. 6, the video streaming system 602 includes access to a computing system environment 600 that includes one or more user input devices 622, one or more output devices 624, and one or more communication connections 626 such as a network interface card and/or a universal serial bus connection.

Exemplary user input devices 622 include a digitizer screen, a stylus, a trackball, a keyboard, a keypad, a mouse and the like. Exemplary output devices 624 include a display unit of the personal computer, a mobile device, the FMS, and the like. Exemplary communication connections 626 include a local area network, a wide area network, and/or other network.

The memory 606 further includes volatile memory 608 and non-volatile memory 610. A variety of computer-readable storage media are stored in and accessed from the memory elements of the FMS 602, such as the volatile memory 608 and the non-volatile memory 610, the removable storage 618 and the non-removable storage 620. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 604, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 604 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 604 of the video streaming system 602. For example, a computer program 612 includes machine-readable instructions capable of virtualization of ambient environments in the live video streaming in the video streaming system 602, according to the teachings and herein described embodiments of the present subject matter. In one embodiment, the computer program 612 is included on a compact disk-read only memory (CD-ROM) and loaded from the CD-ROM to a hard drive in the non-volatile memory 610. The machine-readable instructions cause the video streaming system 602 to encode according to the various embodiments of the present subject matter.

As shown, the computer program 612 includes the live video stream environment virtualization module 628. For example, the live video stream environment virtualization module 628 can be in the form of instructions stored on a non-transitory computer-readable storage medium. The non-transitory computer-readable storage medium having the instructions that, when executed by the video streaming system 602, causes the video streaming system 602 to perform the one or more methods described in FIGS. 1 through 5.

In various embodiments, the systems and methods described in FIGS. 1 through 5 enable virtualization of ambient environments in a live video stream captured by a fixed-mounted video camera in any indoor or outdoor location.

Further, the methods described in FIGS. 1 through 5 enable to reduce the computational intensity of processing the video.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for virtualization of ambient environments in live video streaming, comprising:
   pre-processing a current frame in a live video stream using a spatial scaling algorithm and a sub-sampled frame rate operation algorithm;
   performing motion detection to obtain motion information in the re-processed current frame in the live video stream:
   computing a background model using the motion information;
   performing background subtraction using the background model to obtain foreground and background pixels for the current frame in the live video stream;
   refining the obtained foreground and background pixels using a median filter;
   post processing the median filtered foreground and background pixels using dilation and erosion algorithms to obtain foreground clusters;
   further refining the obtained foreground clusters using configurable attribute based filters to obtain refined foreground bounding boxes around each of the obtained foreground clusters, wherein the configurable attribute based filters are selected from the group consisting of a size based filter, an aspect ratio based filter, a symmetry based filter, a cluster density based filter and a histogram based filter;
   further refining the refined foreground bounding boxes using user configurable rule based filters stored as a rule book to obtain object classification information;
   further refining the refined foreground bounding boxes using bounding box tracking to obtain temporal tracking information for the foreground bounding boxes;
   decision refinement of the foreground and background pixels using the object classification information and the temporal tracking information to obtain final refined background and foreground pixels for the current frame;
   generating an output frame for the current frame by superimposing the final refined foreground pixels on a virtual background obtained from a user; and
   repeating all the above steps from pre-processing to generating an output frame for a next frame in the live video stream.

2. The method of claim 1, further comprising:
   context aware encoding of the output frame in the live video stream using a scalable video encoding (SVC) algorithm, wherein the SVC algorithm uses the obtained refined foreground and background pixels to tune and optimize temporal, spatial or quality scalability.

3. The method of claim 1, further comprising:
   adaptation of the background model with the final refined background pixels for processing of subsequent frames; and
   controlling the adaptation of the background model based on events and rules defined for a specific application.

4. The method of claim 1, wherein the live video streaming comprises the live video stream coming from a single and fixed-mounted video camera.

5. A non-transitory computer-readable storage medium for virtualization of ambient environments in live video streaming in a video streaming system having instructions that when executed by a computing device, cause the computing device to:
   pre-process a current frame in a live video stream using a spatial scaling algorithm and a sub-sampled frame rate operation algorithm;
   perform motion detection to obtain motion information in the pre-processed current frame in the live video stream;
   compute a background model using the motion information;
   perform background subtraction using the background model to obtain foreground and background pixels for the current frame in the live video stream;
   refine the obtained foreground and background pixels using a median filter;
   post process the median filtered foreground and background pixels using dilation and erosion algorithms to obtain foreground clusters;
   further refine the obtained foreground clusters using configurable attribute based filters to obtain refined foreground bounding boxes around each of the obtained foreground clusters, wherein the configurable attribute based filters are selected from the group consisting of a size based filter, an aspect ratio based filter, a symmetry based filter, a cluster density based filter and a histogram based filter;
   further refine the refined foreground bounding boxes using user configurable rule based filters stored as a rule book to obtain object classification information;
   further refine the refined foreground bounding boxes using bounding box tracking to obtain temporal tracking information for the foreground bounding boxes;
   decision refinement of the foreground and background pixels using the object classification information and the temporal tracking information to obtain final refined background and foreground pixels for the current frame;
   generate an output frame for the current frame by superimposing the final refined foreground pixels on a virtual background obtained from a user; and
   repeat all the above steps from pre-processing to generating an output frame for a next frame in the live video stream.

6. A system for virtualization of ambient environments in live video streaming, comprising:
   a fixed-mounted video camera;
   a server coupled to the fixed-mounted video camera, wherein the server to implement a video streaming application including a virtual environment processing module; and
   a plurality of video receivers coupled to the server via a communication network, wherein the virtual environment processing module pre-processes a current frame in a live video stream using a spatial scaling algorithm and a sub-sampled frame rate operation algorithm, wherein the virtual environment processing module performs motion detection to obtain motion information in the pre-processed current frame in the live video stream, wherein the virtual environment processing module computes a background model using the motion information, wherein the virtual environment processing module performs background subtraction using the background model to obtain foreground and background pixels for the current frame in the live video stream, wherein the virtual environment processing module refines the obtained foreground and background pixels using a median filter, wherein the virtual environment processing module post processes the median filtered foreground and background pixels using dilation and erosion algorithms to obtain foreground clusters, wherein the virtual environment processing module further refines the obtained foreground clusters using configurable attribute based filters to obtain refined foreground bounding boxes around each of the obtained foreground clusters, wherein the configurable attribute based filters are selected from the group consisting of a size based filter, an aspect ratio based filter, a symmetry based filter, a cluster density based filter and a histogram based filter, wherein the virtual environment processing module further refines the refined foreground bounding boxes using user configurable rule based filters stored as a rule book to obtain object classification information, wherein the virtual environment processing module further refines the refined foreground bounding boxes using bounding box tracking to obtain temporal tracking information for the foreground bounding boxes, wherein the virtual environment processing module performs decision refinement of the foreground and background pixels using the object classification information and the temporal tracking information to obtain final refined background and foreground pixels for the current frame, wherein the virtual environment processing module generates an output frame for the current frame by superimposing the final refined foreground pixels on a virtual background obtained from a user, and wherein the virtual environment processing module repeats all the above steps from pre-processing to generating an output frame for a next frame in the live video stream.

7. The system of claim 6, wherein the video streaming application further comprises:
a context aware encoding module coupled to the virtual environment processing module, wherein the context aware encoding module performs context aware encoding of the output frame in the live video stream using a scalable video encoding (SVC) algorithm, wherein the SVC algorithm uses the obtained refined foreground and background pixels to tune and optimize temporal, spatial or quality scalability.

8. The system of claim 6, wherein the virtual environment processing module adapts the background model with the final refined background pixels for processing of subsequent frames and wherein the virtual environment processing module controls the adaptation of the background model based on events and rules defined for a specific application.

9. The system of claim 6, wherein the live video streaming comprises the live video stream coming from the fixed-mounted video camera.

10. A system for virtualization of ambient environments in live video streaming, comprising:
a fixed-mounted video camera, wherein the fixed-mounted video camera includes a virtual environment processing module;
a server coupled to the fixed-mounted video camera, wherein the server to implement a video streaming application; and
a plurality of video receivers coupled to the server via a communication network, wherein the virtual environment processing module pre-processes a current frame in a live video stream using a spatial scaling algorithm and a sub-sampled frame rate operation algorithm, wherein the virtual environment processing module performs motion detection to obtain motion information in the pre-processed current frame in the live video stream, wherein the virtual environment processing module computes a background model using the motion information, wherein the virtual environment processing module performs background subtraction using the background model to obtain foreground and background pixels for the current frame in the live video stream, wherein the virtual environment processing module refines the obtained foreground and background pixels using a median filter, wherein the virtual environment processing module post processes the median filtered foreground and background pixels using dilation and erosion algorithms to obtain foreground clusters, wherein the virtual environment processing module further refines the obtained foreground clusters using configurable attribute based filters to obtain refined foreground bounding boxes around each of the obtained foreground clusters, wherein the configurable attribute based filters are selected from the group consisting of a size based filter, an aspect ratio based filter, a symmetry based filter, a cluster density based filter and a histogram based filter, wherein the virtual environment processing module further refines the refined foreground bounding boxes using user configurable rule based filters stored as a rule book to obtain object classification information, wherein the virtual environment processing module further refines the refined foreground bounding boxes using bounding box tracking to obtain temporal tracking information for the foreground bounding boxes, wherein the virtual environment processing module performs decision refinement of the foreground and background pixels using the object classification information and the temporal tracking information to obtain final refined background and foreground pixels for the current frame, wherein the virtual environment processing module generates an output frame for the current frame by superimposing the final refined foreground pixels on a virtual background obtained from a user, and wherein the virtual environment processing module repeats all the above steps from pre-processing to generating an output frame for a next frame in the live video stream.

11. The system of claim 10, wherein the video streaming application further comprises:
a context aware encoding module coupled to the virtual environment processing module, wherein the context aware encoding module performs context aware encoding of the output frame in the live video stream using a scalable video encoding (SVC) algorithm, wherein the SVC algorithm uses the obtained refined foreground and background pixels to tune and optimize temporal, spatial or quality scalability.

12. The system of claim 10, wherein the virtual environment processing module adapts the background model with the final refined background pixels for processing of subsequent frames and wherein the virtual environment processing module controls the adaptation of the background model based on events and rules defined for a specific application.

13. The system of claim 10, wherein the live video streaming comprises the live video stream coming from the fixed-mounted video camera.

14. A system for virtualization of ambient environments in live video streaming, comprising:
a fixed-mounted video camera, wherein the fixed-mounted video camera includes a virtual environment processing module;

a server coupled to the fixed-mounted video camera; and a plurality of video receivers coupled to the server via a communication network, wherein the virtual environment processing module pre-processes a current frame in a live video stream using a spatial scaling algorithm and a sub-sampled frame rate operation algorithm, wherein the virtual environment processing module performs Motion detection to obtain motion information in the pre-processed current frame in the live video stream, wherein the virtual environment processing module computes a background model using the motion information, wherein the virtual environment processing module performs background subtraction using the background model to obtain foreground and background pixels for the current frame in the live video stream, wherein the virtual environment processing module refines the obtained foreground and background pixels using a median filter, wherein the virtual environment processing module post processes the median filtered foreground and background pixels using dilation and erosion algorithms to obtain foreground clusters, wherein the virtual environment processing module further refines the obtained foreground clusters using configurable attribute based filters to obtain refined foreground hounding boxes around each of the obtained foreground clusters, wherein the configurable attribute based filters are selected from the group consisting of a size based filter, an aspect ratio based filter, a symmetry based filter, a cluster density based filter and a histogram based filter, wherein the virtual environment processing module further refines the refined foreground bounding boxes using user configurable rule based filters stored as a rule book to obtain object classification information, wherein the virtual environment processing module further refines the refined foreground bounding boxes using bounding box tracking to obtain temporal tracking information for the foreground bounding boxes, wherein the virtual environment processing module performs decision refinement of the foreground and background pixels using the object classification information and the temporal tracking information to obtain final refined background and foreground pixels for the current frame, wherein the virtual environment processing module generates an output frame for the current frame by superimposing the final refined foreground pixels on a virtual background obtained from a user, and wherein the virtual environment processing module repeats all the above steps from pre-processing to generating, an output frame for a next frame in the live video stream.

15. The system of claim 14, wherein the video streaming application further comprises:

a context aware encoding module coupled to the virtual environment processing module, wherein the context aware encoding module performs context aware encoding of the output frame in the live video stream using a scalable video encoding (SVC) algorithm, wherein the SVC algorithm uses the obtained refined foreground and background pixels to tune and optimize temporal, spatial or quality scalability.

16. The system of claim 14, wherein the virtual environment processing module adapts the background model with the final refined background pixels for processing of subsequent frames and wherein the virtual environment processing module controls the adaptation of the background model based on events and rules defined for a specific application.

17. The system of claim 14, wherein the live video streaming comprises the live video stream coming from the fixed-mounted video camera.

18. The method of claim 1, wherein the sub-sampled frame rate operation algorithm uses a sub-sampling frame rate that is determined based on the computational capacity of a system on which processing is performed.

19. The method of claim 1, farther comprising:

context aware encoding of the output frame in the live video stream using a selective encoding of regions of interest (ROI) algorithm to educe encoding processing cycles and the amount of data to be transmitted over the network, wherein the bounding boxes for the foreground pixels along with the virtual background are encoded.

20. The non-transitory computer-readable storage medium of claim 5, wherein the sub-sampled frame rate operation algorithm uses a sub-sampling frame rate that is determined based on the computational capacity of a system on which processing is performed.

21. The system of claim 6, wherein the sub-sampled frame rate operation algorithm uses a sub-sampling frame rate that is determined based on the computational capacity of a system on which processing is performed.

22. The system of claim 6, wherein the video streaming application further comprises:

a context aware encoding module coupled to the virtual environment processing module, wherein the context aware encoding module performs context aware encoding of the output frame in the live video stream using a selective encoding of regions of interest (ROI) algorithm to reduce encoding processing cycles and the amount of data to be transmitted over the network, wherein the bounding boxes for the foreground pixels along with the virtual background are encoded.

23. The method of claim 1, wherein pre-processing the current frame in a live video stream further comprises:

pre-processing the current frame in the live video stream using a noise reduction algorithm.

24. The non-transitory computer-readable storage medium of claim 5, wherein pre-processing the current frame in a live video stream further comprises:

pre-processing the current frame in the live video stream using a noise reduction algorithm.

25. The system of claim 6, wherein the virtual environment processing module further pre-processes the current frame in the live video stream using a noise reduction algorithm.

26. The system of claim 10, wherein the virtual environment processing module further pre-processes the current frame in the live video stream using a noise reduction algorithm.

27. The system of claim 10, wherein the video streaming application further comprises:

a context aware encoding module coupled to the virtual environment processing module, wherein the context aware encoding module performs context aware encoding of the output frame in the live video stream using a selective encoding of regions of interest (ROI) algorithm to reduce encoding processing cycles and the amount of data to be transmitted over the network, wherein the bounding boxes for the foreground pixels along with the virtual background are encoded.

28. The method of claim 14, wherein the virtual environment processing module further pre-processes the current frame in the live video stream using a noise reduction algorithm.

29. The system of claim 14, wherein the video streaming application further comprises:

a context aware encoding module coupled to the virtual environment processing module, wherein the context aware encoding module performs context aware encoding of the output frame in the live video stream using a selective encoding of regions of interest (ROI) algorithm to reduce encoding processing cycles and the amount of data to be transmitted over the network, wherein the bounding boxes for the foreground pixels along with the virtual background are encoded.

* * * * *